United States Patent
Chen (10) Patent No.: US 11,476,749 B2
(45) Date of Patent: Oct. 18, 2022

(54) SWITCHING MODE POWER SUPPLY WITH ADAPTIVE THRESHOLD SETTING

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 7 days.

(21) Appl. No.: 17/354,505

(22) Filed: Jun. 22, 2021

(65) Prior Publication Data

US 2021/0399622 A1 Dec. 23, 2021

(30) Foreign Application Priority Data

Jun. 23, 2020 (CN) .......................... 202010578215.7

(51) Int. Cl.
*H02M 1/08* (2006.01)
*H02M 1/00* (2006.01)
*H02M 3/335* (2006.01)

(52) U.S. Cl.
CPC ........... *H02M 1/08* (2013.01); *H02M 1/0054* (2021.05); *H02M 3/33592* (2013.01)

(58) Field of Classification Search
CPC .. H02M 1/08; H02M 1/0054; H02M 3/33592; H02M 1/0006; H02M 1/0064
See application file for complete search history.

(56) References Cited

U.S. PATENT DOCUMENTS 10,186,976 B2 * 1/2019 Duvnjak ........... H02M 3/33592
10,763,752 B1 * 9/2020 Li ..................... H02M 3/33507

* cited by examiner

*Primary Examiner* — Adolf D Berhane
*Assistant Examiner* — Afework S Demisse
(74) *Attorney, Agent, or Firm* — Perkins Coie LLP (57) ABSTRACT

A switching mode power supply with an adaptive setting of a threshold valley voltage. The switching mode power supply decreases a reference auxiliary current when a valley value of a primary switching voltage across a primary switch is smaller than a first threshold valley voltage. And in addition, the switching mode power supply can increase the reference auxiliary current when the valley value of the primary switching voltage is larger than a second threshold valley voltage.

19 Claims, 5 Drawing Sheets

SWITCHING MODE POWER SUPPLY WITH ADAPTIVE THRESHOLD SETTING

CROSS-REFERENCE TO RELATED APPLICATIONS

This application claims the benefit of CN application No. CN202010578215.7, filed on Jun. 23, 2020, and incorporated herein by reference.

FIELD OF THE INVENTION

The present invention relates generally to electronic circuits, more particularly but not exclusively to the control of a flyback switching converter.

BACKGROUND OF THE INVENTION

A flyback switching converter usually comprises a primary switch and an auxiliary switch. In a conventional driving method, when the auxiliary switch is turned on, an auxiliary current flowing through the auxiliary switch decreases in a forward direction first, crosses zero, and then increases in a reverse direction opposite the forward direction. After the auxiliary current increases to a preset reference auxiliary current in the reverse direction, the auxiliary switch is turned off and a primary switching voltage across the primary switch decreases rapidly. And after the primary switching voltage decreases to its valley value, the primary switch is turned on. In the conventional driving method, the loss of the flyback switching converter is relatively large and the system efficiency is not high.

Thus, there is a need for a driving method, a driving circuit and a switching mode power supply thereof with decreased system loss and improved system efficiency.

SUMMARY

Embodiments of the present invention are directed to a driving method for driving a switching mode power supply, wherein the switching mode power supply comprises a transformer having a primary winding and an auxiliary winding with an auxiliary current flowing through the auxiliary winding, and the switching mode power supply further comprises a primary switch and an auxiliary switch, and wherein the primary switch is coupled to the primary winding in series, and the primary switch has a first terminal and a second terminal and between the first terminal and the second terminal of the primary switch exits a primary switching voltage having a valley value, and the auxiliary switch is coupled to the auxiliary winding in series, and the auxiliary switch has a first terminal and a second terminal and between the first terminal and the second terminal of the auxiliary switch exits an auxiliary switching voltage, the driving method comprising: turning off the auxiliary switch after the auxiliary current reaches a reference auxiliary current; and turning on the primary switch after the valley value of the primary switching voltage occurs; wherein the reference auxiliary current is decreased when the valley value of the primary switching voltage is smaller than a first threshold valley voltage.

Embodiments of the present invention are also directed to a driving circuit used in a switching mode power supply, wherein the switching mode power supply comprises a transformer having a primary winding and a secondary winding and the switching mode power supply further comprises a primary switch and an auxiliary switch, wherein the auxiliary switch is coupled to the auxiliary winding in series and an auxiliary current flows through the auxiliary winding, and the primary switch is coupled to the primary winding in series, and wherein both the primary switch and the auxiliary switch have a first terminal, a second terminal and a control terminal, and between the first terminal and the second terminal of the primary switch exits a primary switching voltage having a valley value and between the first terminal and the second terminal of the auxiliary switch exits an auxiliary switching voltage, and the driving circuit provides the auxiliary off signal to control the switching-off operation of the auxiliary switch, the driving circuit comprising: a reference auxiliary current generation circuit configured to generate a reference auxiliary current based on the valley value of the primary switching voltage and the first threshold valley voltage, wherein the reference auxiliary current is decreased when the valley value of the primary switching voltage is smaller than the first threshold valley voltage; and a comparison circuit configured to receive the reference auxiliary current and the auxiliary current and to generate an auxiliary off signal based on comparing the auxiliary current with the reference auxiliary current.

Embodiments of the present invention are further directed to a switching mode power supply, comprising: a transformer having a primary winding and a secondary winding with an auxiliary current flowing through the secondary winding; a primary switch coupled in series with the primary winding, wherein the primary switch has a first terminal, a second terminal and a control terminal and between the first terminal and the second terminal of the primary switch exits a primary switching voltage having a valley value; an auxiliary switch coupled in series with the auxiliary winding, wherein the auxiliary switch has a first terminal, a second terminal and a control terminal and between the first terminal and the second terminal of the auxiliary switch exits an auxiliary switching voltage; and a driving circuit comprising: a reference auxiliary current generation circuit configured to generate a reference auxiliary current based on the valley value of the primary switching voltage and the first threshold valley voltage, wherein the reference auxiliary current is decreased when the valley value of the primary switching voltage is smaller than the first threshold valley voltage; and a comparison circuit configured to receive the reference auxiliary current and the auxiliary current and to generate an auxiliary off signal based on comparing the auxiliary current with the reference auxiliary current.

DESCRIPTION OF THE DRAWINGS

The present invention can be further understood with reference to the following detailed description and the appended drawings, wherein like elements are provided with like reference numerals.

DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the invention, the meaning of "a," "an," and "the" may also comprise plural references.

Those skilled in the art will understand that, in the present invention, the operations of "increasing", "decreasing" and "maintaining" a current refer to the increase, decrease or maintenance of the absolute value of the current. For example, when the direction of a current is opposite to a defined direction, i.e., when the current has a negative value, the current becomes smaller with an increase of the current as the increase of the current actually refers to the increase of the absolute value of the current; while when the direction of the current is as the same as the defined direction, i.e., when the current has a positive value, the current becomes larger with an increase of the current as the increase of the current actually refers to the increase of the absolute value of the current. Similarly, when the direction of the current is opposite to the defined direction, i.e., when the current has a negative value, the current becomes larger with a decrease of the current as the decrease of the current actually refers to the decrease of the absolute value of the current; while when the direction of the current is as the same as the defined direction, i.e., when the current has a positive value, the current becomes smaller with a decrease of the current as the decrease of the current actually refers to the decrease of the absolute value of the current.

Those skilled in the art will also understand that, in the present invention, the description of the situation that an operation is taken "after" a condition is satisfied may refer to the situation that the operation is immediately taken once the condition is satisfied or may refer to the situation that the operation is taken after a delay time since the condition is satisfied. For example, when stating that "the auxiliary switch is turned off after the auxiliary current reaches the reference auxiliary current", it may refer to the operation of turning off the auxiliary switch immediately after the auxiliary current reaches the reference auxiliary current or the operation of turning off the auxiliary switch after a delay time since the auxiliary current reaches the reference auxiliary current. For another example, when stating that "the primary switch is turned on after a valley value of the primary switching voltage occurs", it may refer to the operation of turning on the primary switch immediately after the valley value of the primary switching voltage occurs or the operation of turning on the primary switch after a delay time since the valley value of the primary switching voltage occurs.

Figure 1:
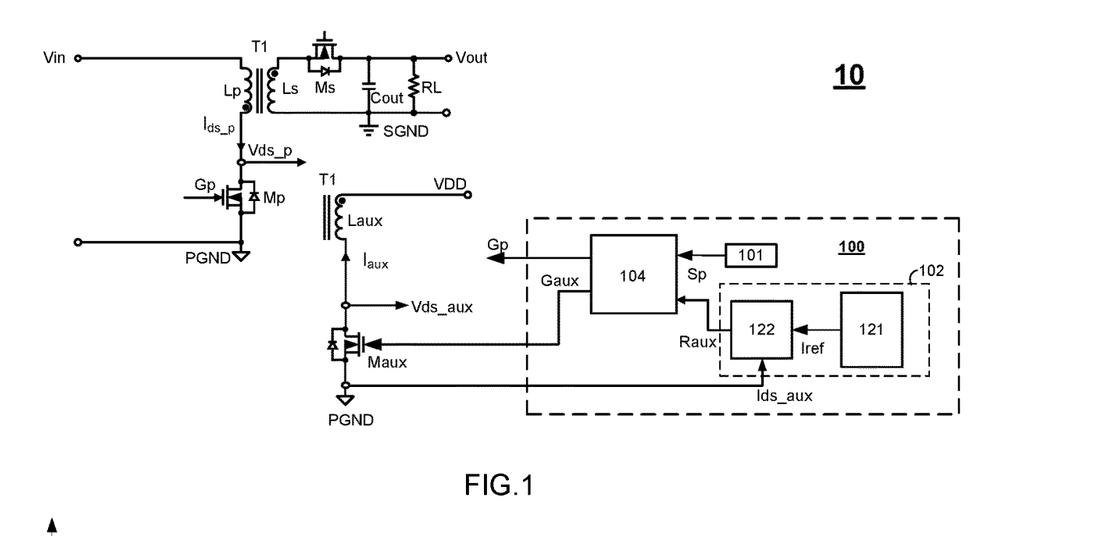
FIG. 1 schematically illustrates a switching mode power supply 10 in accordance with an embodiment of the present invention.

FIG. 1 schematically illustrates a switching mode power supply 10 in accordance with an embodiment of the present invention. As shown in FIG. 1, the switching mode power supply 10 comprises a transformer T1 having a primary winding Lp and an auxiliary winding Laux. A primary current Ids_p flows through the primary winding Lp and an auxiliary current Iaux flows through the auxiliary winding Laux. The primary winding Lp and the auxiliary winding Laux each have a first terminal and a second terminal, wherein the first terminal of the primary winding Lp is configured to receive an input voltage Vin, and the first terminal of the auxiliary winding Laux may be configured to provide a supply voltage VDD to the internal circuitry of the switching mode power supply 10. The switching mode power supply 10 may further comprise a primary switch Mp coupled to the primary winding Lp in series. The primary switch Mp has a first terminal, a second terminal and a control terminal, wherein the first terminal of the primary switch Mp is coupled to the second terminal of the primary winding Lp, the second terminal of the primary switch Mp is coupled to a primary reference ground PGND, and between the first terminal and the second terminal of the primary switch Mp exists a primary switching voltage Vds_p. The primary switch Mp has an output capacitance Coss. The switching mode power supply 10 may further comprise an auxiliary switch Maux coupled to the auxiliary winding Laux in series. The auxiliary switch Maux has a first terminal, a second terminal and a control terminal, wherein the first terminal of the auxiliary switch Maux is coupled to the second terminal of the auxiliary winding Laux, the second terminal of the auxiliary switch Maux is coupled to the primary reference ground PGND, and between the first terminal and the second terminal of the auxiliary switch Maux exists an auxiliary switching voltage Vds_aux.

As shown in FIG. 1, the transformer T1 further has a secondary winding Ls having a first terminal and a second terminal, wherein the first terminal of the secondary winding Ls is coupled to a secondary reference ground SGND. The switching mode power supply 10 further comprises a secondary switch Ms and an output capacitor Cout. The secondary switch Ms is serially coupled to the secondary winding Ls and the secondary switch Ms has a first terminal, a second terminal and a control terminal, wherein the first terminal of the secondary switch Ms is coupled to the second terminal of the secondary winding Ls, the second terminal of the secondary switch Ms is configured to provide an output voltage Vout to a load RL. The output capacitor Cout is coupled between the second terminal of the secondary switch Ms and the secondary reference ground SGND. By turning the primary switch Mp, the secondary switch Ms and the auxiliary switch Maux on and off, energy is transferred among the primary winding Lp, the secondary winding Ls and the auxiliary winding Laux of the transformer T1, and the input voltage Vin is thus converted to the output voltage Vout.

Those skilled in the art will understand that, in the present invention, the primary switch, the auxiliary switch and/or the secondary switch may be integrated inside a chip or may be coupled to the chip externally according to a specific circuit design. In an embodiment, the primary switch and the secondary switch are coupled to the chip externally, while the auxiliary switch is integrated inside the chip. Those skilled in the art will also understand that, in the present invention, the primary switch, the auxiliary switch and/or the secondary switch may be implemented with any type of controlled switch, for example, a metal oxide semiconductor field effect transistor (MOSFET), a gallium nitride field effect transistor (GaN FET) or the like. Further, the secondary switch of the present invention may be implemented with a non-controlled switch, such as a diode, etc. In an embodiment, the first terminal and the second terminal of the primary switch, the auxiliary switch and/or the secondary switch may respectively refer to a drain and a source of an N-type transistor. In another embodiment, the switching mode power supply of the present invention may comprise a flyback switching converter or the like.

The switching mode power supply 10 further comprises a driving circuit 100 configured to provide a primary control signal Gp to control the switching-on operation and the switching-off operation of the primary switch Mp and to provide an auxiliary control signal Gaux to control the switching-on operation and the switching-off operation of the auxiliary switch Maux. More specifically, the driving circuit 100 comprises a primary on circuit 101 configured to generate a primary on signal Sp to control the switching-on operation of the primary switch Mp. The driving circuit 100 comprises an auxiliary off circuit 102 configured to generate an auxiliary off signal Raux to control the switching-off operation of the auxiliary switch Maux. The driving circuit 100 further comprises a logic circuit 104 coupled to the primary on circuit 101 to receive the primary on signal Sp and coupled to the auxiliary off circuit 102 to receive the auxiliary off signal Raux. The logic circuit 104 is configured to generate the primary control signal Gp based on the primary on signal Sp and to generate the auxiliary control signal Gaux based on the auxiliary off signal Raux.

As shown in FIG. 1, the auxiliary off circuit 102 comprises a reference auxiliary current generation circuit 121 configured to generate a reference auxiliary current Iref based on a valley value Vv of the primary switching voltage Vds_p and a first threshold valley voltage Vvth1. Specifically, the reference auxiliary current generation circuit 121 decreases the reference auxiliary current Iref when the valley value Vv of the primary switching voltage Vds_p is smaller than the first threshold valley voltage Vvth1. More specifically, the reference auxiliary current generation circuit 121 generates the reference auxiliary current Iref based on comparing a valley indicating signal Vva indicative of the valley value Vv of the primary switching voltage Vds_p with a first threshold indicating signal Vhys1 indicative of the first threshold valley voltage Vvth1. In detail, the reference auxiliary current generation circuit 121 decreases the reference auxiliary current Iref when the valley indicating signal Vva is smaller than the first threshold indicating signal Vhys1. The auxiliary off circuit 102 further comprises a comparison circuit 122 coupled to the reference auxiliary current generation circuit 121 to receive the reference auxiliary current Iref. The comparison circuit 122 further receives the auxiliary current Iaux. The comparison circuit 122 generates the auxiliary off signal Raux based on comparing the reference auxiliary current Iref with the auxiliary current Iaux. Specifically, the auxiliary off signal Raux transits from a non-active state into an active state to turn off the auxiliary switch Maux after the auxiliary current Iaux reaches the reference auxiliary current Iref.

In an embodiment, the reference auxiliary current generation circuit 121 generates the reference auxiliary current Iref further based on the valley value Vv of the primary switching voltage Vds_p and a second threshold valley voltage Vvth2, wherein the second threshold valley voltage Vvth2 is larger than the first threshold valley voltage Vvth1. Specifically, the reference auxiliary current generation circuit 121 increases the reference auxiliary current Iref when the valley value Vv of the primary switching voltage Vds_p is larger than the second threshold valley voltage Vvth2. More specifically, the reference auxiliary current generation circuit 121 generates the reference auxiliary current Iref based on comparing the valley indicating signal Vva indicative of the valley value Vv of the primary switching voltage Vds_p with a second threshold indicating signal Vhys2 indicative of the second threshold valley voltage Vvth2, wherein the second threshold indicating signal Vhys2 is larger than the first threshold indicating signal Vhys1. Specifically, the reference auxiliary current generation circuit 121 increases the reference auxiliary current Iref when the valley indicating signal Vva is larger than the second threshold indicating signal Vhys2.

In yet another embodiment, the reference auxiliary current generation circuit 121 maintains the reference auxiliary current Iref when the valley value Vv of the primary switching voltage Vds_p is located between the first threshold valley voltage Vvth1 and the second threshold valley voltage Vvth2. More specifically, the reference auxiliary current generation circuit 121 maintains the reference auxiliary current Iref when the valley indicating signal Vva is located between the first threshold indicating signal Vhys1 and the second threshold indicating signal Vhys2.

In an embodiment, the driving circuit 100 further comprises a primary off circuit and a secondary on circuit (not shown). The primary off circuit generates a primary off signal to control the switching-off operation of the primary switch Mp, and the auxiliary on circuit generates an auxiliary on signal to control the switching-on operation of the auxiliary switch Maux. In such the embodiment, the logic circuit 104 is coupled to the primary on circuit 101 and the primary off circuit to respectively receive the primary on signal Sp and the primary off signal and generates the primary control signal Gp based on the primary on signal Sp and the primary off signal. The logic circuit 104 is further coupled to the auxiliary off circuit 102 and the auxiliary on circuit to respectively receive the auxiliary off signal Raux and the auxiliary on signal and generates the auxiliary control signal Gaux based on the auxiliary off signal Raux and the auxiliary on signal. In an embodiment, the primary off signal may be generated under a peak current control, i.e., the primary switch Mp is turned off after the primary current Ids_p flowing through the primary winding Lp reaches a preset peak current. In another embodiment, the auxiliary on signal transits from a non-active state to an active state and the auxiliary switch Maux is thus turned on after a delay time since the primary switch Mp is turned off or immediately after the primary switch Mp is turned off. Persons or ordinary skill in the art will understand that the primary off signal and the auxiliary on signal may be generated in a variety of manners, and any appropriate manner is within the scope of the present invention. In yet another embodiment, the control of the secondary switch Ms may be provided by another separate chip.

Figure 2:
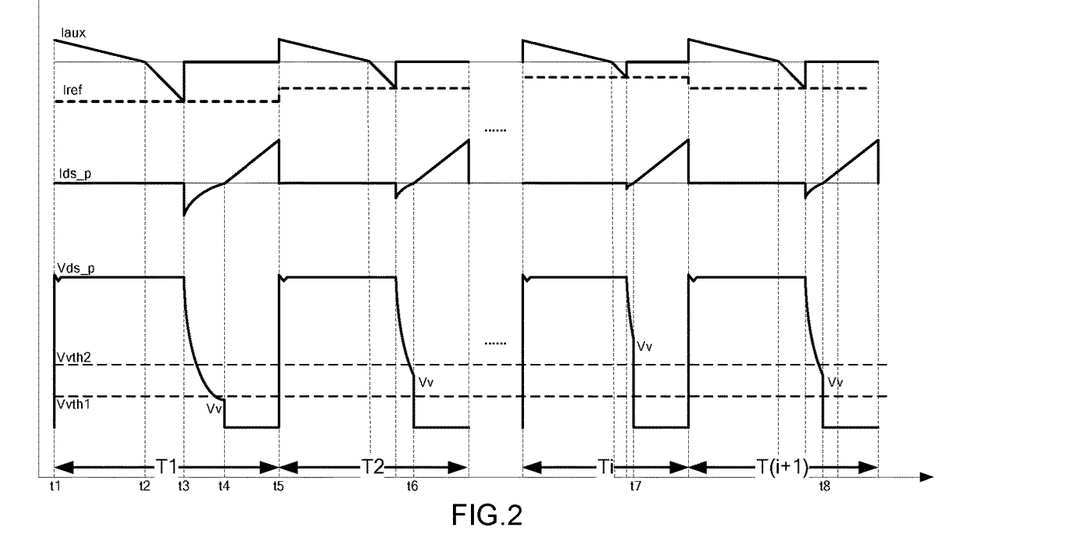
FIG. 2 shows a plurality of waveforms of the switching mode power supply 10 shown in FIG. 1.

FIG. 2 shows a plurality of waveforms of the switching mode power supply 10 shown in FIG. 1. Next, the operation of the switching mode power supply 10 will be elaborated in more details with reference to FIG. 1 and FIG. 2. From top to bottom, FIG. 2 respectively shows the auxiliary current Iaux, the reference auxiliary current Iref, the primary current Ids_p, and the primary switching voltage Vds_p. As shown in FIG. 2, at time t1, the auxiliary switch Maux is turned on and the primary switch Mp is turned off, and the energy stored in the primary winding Lp is therefore coupled to the auxiliary winding Laux, and the auxiliary current Iaux thus flows through the auxiliary winding Laux with a direction (a forward direction) as indicated in FIG. 1. Subsequently, the auxiliary current Iaux decreases gradually, and at time t2, the auxiliary current Iaux decreases to zero. Since the auxiliary switch Maux remains on after time t2, the auxiliary current Iaux reverses and increases gradually in a reverse direction after time t2. At time t3, the auxiliary current Iaux increases to the reference auxiliary current Iref in the reverse direction, and the auxiliary switch Maux is thus turned off. Still referring to FIG. 2, after time t3, the primary current Ids_p flowing through the primary winding Lp discharges the output capacitance Coss of the primary switch Mp, the primary current Ids_p begins to decrease in a reverse direction, and the primary switching voltage Vds_p decreases rapidly. At time t4, the primary current Ids_p decreases to zero, and the primary switching voltage Vds_p decreases to the valley value Vv. Those skilled in the art will understand that, a valley value of a signal in the present invention may refer to an extremum value that is locally minimal e.g., the valley value of the primary switching voltage may refer to the minimum value of the primary switching voltage generated after the auxiliary switch is turned off and before the primary switch is turned on. Continuing referring to FIG. 2, at time t4, the primary switch Mp is turned on and the primary current Ids_p increases gradually in a forward direction until the primary switch Mp is turned off after a condition for turning off the primary switch Mp is satisfied at time t5, for example, after the primary current Ids_p increases to a preset value. Those skilled in the art will understand that, in the embodiment shown in FIG. 2, the primary switch Mp is turned off and the auxiliary switch Maux is turned on at time t5. However, in another embodiment, the auxiliary switch Maux may be turned on after a delay time since the primary switch Mp is turned off at time t5. A switching cycle T1 of the switching mode power supply 10 ends at time t5 and afterwards, the switching mode power supply 10 enters into the next switching cycle T2 to repeat the above-described operation.

At time t4, the valley value Vv occurs. As shown in FIG. 2, since the valley value Vv is smaller than the first threshold valley voltage Vvth1, the reference auxiliary current generation circuit 121 decreases the reference auxiliary current Iref. In this manner, the valley value Vv will occur in advance in the next switching cycle T2 (at time t6), compared with in the first switching cycle T1. Thus, the valley value Vv occurring in the switching cycle T2 is larger than the valley value Vv occurring in the switching cycle T1. In an embodiment, the valley value Vv occurring in the switching cycle T2 is larger than the first threshold valley voltage Vvth1, which thus helps to decrease the loss caused by the small valley value Vv of the primary switching voltage Vds_p.

With continued reference to FIG. 2, in a switching cycle Ti, the valley value Vv is larger than the second threshold valley voltage Vvth2 and the switching loss of the switching mode power supply 10 is relatively larger. As shown in FIG. 2, in the next switching cycle T(i+1) following the switching cycle Ti, the reference auxiliary current generation circuit 121 increases the reference auxiliary current Iref. As shown in FIG. 2, the increase of the reference auxiliary current Iref makes the valley value Vv occurring in the switching cycle T(i+1) smaller than the valley value Vv occurring in the switching cycle Ti. In an embodiment, the valley value Vv occurring in the switching cycle T(i+1) will be smaller than the second threshold valley voltage Vvth2, which helps to decrease the loss caused by the large valley value Vv of the primary switching voltage Vds_p. In an embodiment, the valley value Vv occurring in the switching cycle T(i+1) will be located between the first threshold valley voltage Vvth1 and the second threshold valley voltage Vvth2. In the way, the loss of the switching mode power supply 10 is relatively small and the efficiency of the switching mode power supply 10 is relatively large.

In an embodiment, the primary switch Mp comprises a super-junction metal oxide semiconductor field effect transistors (super-junction MOSFET) due to an overall small output capacitance Coss of the super-junction MOSFET, which makes the switching loss of the switching mode power supply 10 decreased and the efficiency of the switching mode power supply 10 improved. However, since the output capacitance Coss of the super-junction MOSFET is non-linear and gets larger and larger with the decrease of the drain-source voltage of the super-junction MOSFET (the primary switching voltage Vds_p), the circulating loss will increase and the efficiency will decrease instead. With the switching mode power supply 10 of the present invention, the reference auxiliary current Iref is decreased to increase the valley value Vv, even to be larger than the first threshold valley voltage Vvth1, the circulating loss caused by the low primary switching voltage Vds_p will thus be decreased. On the other hand, the reference auxiliary current Iref can make the valley value Vv smaller than the second threshold valley voltage Vvth2, the switching loss caused by the large primary switching voltage Vds_p will thus be decreased. In this way, the switching mode power supply 10 of the present invention takes an advantage of the low switching loss of the super-junction MOSFET and meanwhile avoids the issue that the switching loss of the super-junction MOSFET is too large, thus improving the overall efficiency. Of course, those skilled in the art will understand that, the switching mode power supply 10 of the present invention can not only solve the issue of the large circulating loss and thus the low efficiency of the super-junction MOSFET, the switching mode power supply 10 of the present invention can also help to improve the efficiency by decreasing the reference auxiliary current for many other circuits, for example, the circuit comprising a gallium nitride field effect transistor.

The switching mode power supply of the present invention can improve the efficiency effectively, and by adjusting the reference auxiliary current Iref at an appropriate value, the issue that the valley value Vv of the primary switching voltage Vds_p cannot be detected as the primary switching voltage Vds_p drops too rapidly can be avoided.

Those skilled in the art will understand that, the increase or decrease of the reference auxiliary current Iref can be linear or can be implemented with one or more steps, wherein the step length(s) of the one or more steps can be a preset fixed value or can be adjusted in real time. In an embodiment, the driving circuit decreases the reference auxiliary current by a first preset current value in the next switching cycle when the valley value of the primary switching voltage is smaller than the first threshold valley voltage. Further in an embodiment, the driving circuit increases the reference auxiliary current by a second preset current value in the next switching cycle when the valley value of the primary switching voltage is larger than the second threshold valley voltage, wherein the second preset current value and the first preset current value may be the same or different. Those skilled in the art will also understand that, in an embodiment, the reason causing the valley value Vv to be smaller than the first threshold valley voltage Vvth1 or to be larger than the second threshold valley voltage Vvth2 may be varied, e.g., the variation of the load, the input voltage Vin and/or the applications.

Figure 3:
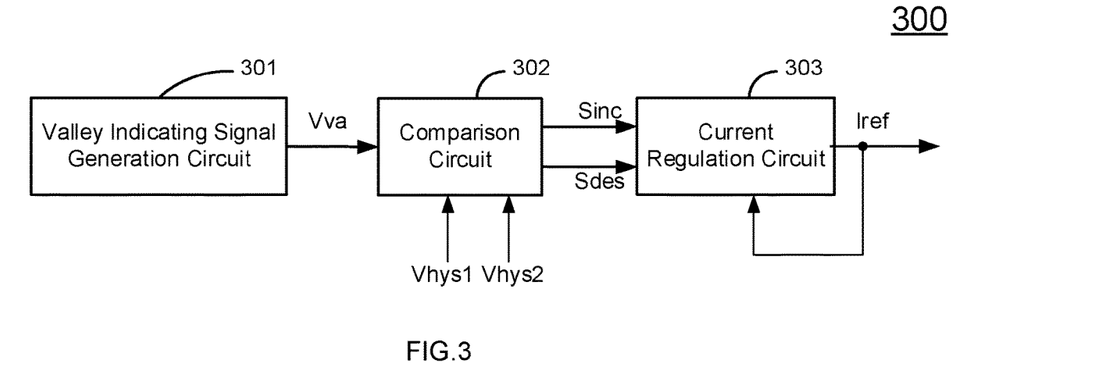
FIG. 3 schematically illustrates a reference auxiliary current generation circuit 300 in accordance with an embodiment of the present invention.

FIG. 3 schematically illustrates a reference auxiliary current generation circuit 300 in accordance with an embodiment of the present invention. The reference auxiliary current generation circuit 300 can be used as the reference auxiliary current generation circuit 121 in FIG. 1 to provide the reference auxiliary current Iref. As shown in FIG. 3, the reference auxiliary current generation circuit 300 comprises a valley indicating signal generation circuit 301, a comparison circuit 302 and a current regulation circuit 303. The valley indicating signal generation circuit 301 is configured to generate the valley indicating signal Vva indicative of the valley value Vv of the primary switching voltage Vds_p. In an embodiment, the valley indicating signal generation circuit 301 receives the auxiliary switching voltage Vds_aux, and generates the valley indicating signal Vva based on the auxiliary switching voltage Vds_aux. In some embodiments, it is easier to detect the auxiliary switching voltage Vds_aux than to detect the primary switching voltage Vds_p as the auxiliary switching voltage Vds_aux is usually lower than the primary switching voltage Vds_p. In some other embodiments, the chip cannot detect the primary switching voltage Vds_p as the primary switch Mp is externally coupled to the chip and no pin is dedicatedly set on the chip for the detection of the primary switching voltage Vds_p. In these situations, the auxiliary switching voltage Vds_aux can be detected to generate the valley indicating signal Vva. Of course, those skilled in the art will understand that, in another embodiment, the valley indicating signal generation circuit 301 may receive the primary switching voltage Vds_p and generate the valley indicating signal Vva based on the primary switching voltage Vds_p. The comparison circuit 302 is coupled to the valley indicating signal generation circuit 301 to receive the valley indicating signal Vva, and the comparison circuit 302 generates a decrease control signal Sdec based on comparing the valley indicating signal Vva with the first threshold indicating signal Vhys1. Specifically, the decrease control signal Sdes transits from a non-active state to an active state when the valley indicating signal Vva is smaller than the first threshold indicating signal Vhys1. The current regulation circuit 303 is coupled to the comparison circuit 302 to receive the decrease control signal Sdec and controls the decrease of the reference auxiliary current Iref based on the decrease control signal Sdec. In particular, the current regulation circuit 303 decreases the reference auxiliary current Iref when the decrease control signal Sdes transits from the non-active state to the active state.

In an embodiment, the comparison circuit 302 further generates an increase control signal Sinc based on comparing the valley indicating signal Vva with a second threshold indicating signal Vhys2. In particular, the increase control signal Sinc transits from a non-active state to an active state when the valley indicating signal Vva is larger than the second threshold indicating signal Vhys2. The current regulation circuit 303 is coupled to the comparison circuit 302 to receive the increase control signal Sinc and controls the increase of the reference auxiliary current Iref based on the increase control signal Sinc. In particular, the current regulation circuit 303 increases the reference auxiliary current Iref when the increase control signal Sinc transits from the non-active state to the active state.

In an embodiment, when the valley indicating signal Vva is located between the first threshold indicating signal Vhys1 and the second threshold indicating signal Vhys2, both the increase control signal Sinc and the decrease control signal Sdes are respectively in their non-active states and the current regulation circuit 303 maintains the reference auxiliary current Iref.

As shown in FIG. 3, in an embodiment, the current regulation circuit 303 is coupled to the comparison circuit 302 to receive the increase control signal Sinc and the decrease control signal Sdes, and the current regulation circuit 303 further receives the reference auxiliary current Iref. The current regulation circuit 303 generates the reference auxiliary current Iref based on the increase control signal Sinc, the decrease control signal Sdes and the reference auxiliary current Iref. Those skilled in the art will understand that, the increase or decrease of the reference auxiliary current Iref can be linear or can be implemented with one or more steps, wherein the step length(s) of the one or more steps can be a preset fixed value or can be adjusted in real time. For example, in an embodiment, if the decrease control signal Sdes transits from the non-active state to the active state, the current regulation circuit 303 decreases the reference auxiliary current Iref by a first preset current value in the next switching cycle; if the increase control signal Sinc transits from the non-active state to the active state, the current regulation circuit 303 increases the reference auxiliary current circuit Iref by a second preset current value in the next switching cycle, wherein the second preset current value and a first preset current value may be the same or different.

Figure 4:
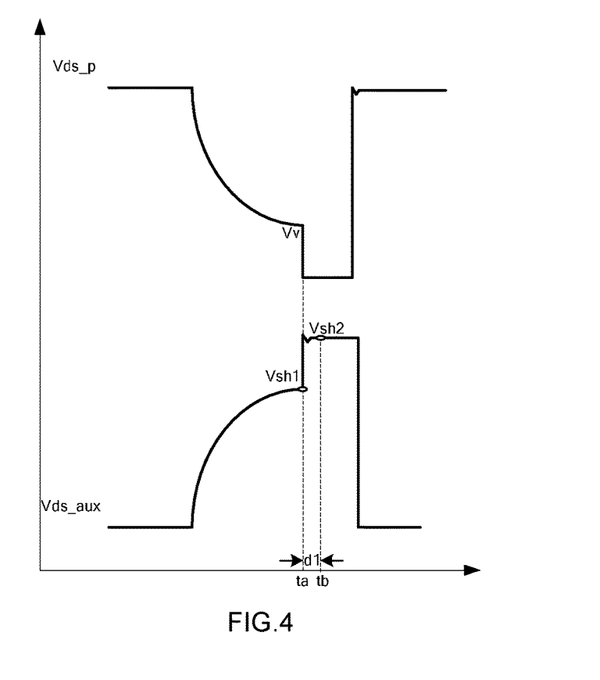
FIG. 4 shows a plurality of waveforms of a valley indicating signal generation circuit in accordance with an embodiment of the present invention.

FIG. 4 shows a plurality of waveforms of a valley indicating signal generation circuit in accordance with an embodiment of the present invention. The valley indicating signal generation circuit in the embodiment of FIG. 4 may be used as the valley indicating signal generation circuit 301 in FIG. 3. The valley indicating signal generation circuit in the embodiment of FIG. 4 receives the auxiliary switching voltage Vds_aux, and generates a valley indicating signal Vva based on the auxiliary switching voltage Vds_aux. From top to bottom, FIG. 4 shows the primary switching voltage Vds_p and the auxiliary switching voltage Vds_aux. As shown in FIG. 4, the valley indicating signal generation circuit samples the auxiliary switching voltage Vds_aux to obtain a first sample voltage Vsh1 after the valley value Vv of the primary switching voltage Vds_p occurs (at time ta). And after the valley value Vv of the primary switching voltage Vds_p occurs (at time ta), the primary switch Mp is turned on and the auxiliary switch Maux is turned off. After a delay time d1 (at time tb), the valley indicating signal generation circuit samples the auxiliary switching voltage Vds_aux to obtain a second sample voltage Vsh2. Of course, those skilled in the art will understand that, the length of the delay time d1 may be set in accordance with the circuit requirements. In another embodiment, the delay time d1 can be omitted.

According to the operating principle of the valley indicating signal generation circuit, the value of the first sample voltage Vsh1 is:

$$Vsh1 = Vds\_aux(ta) = Vcc - (Vds\_p(ta) - Vin)/N$$

The value of the second sample voltage Vsh2 is:

$$Vsh2 = Vds\_aux(tb) = Vcc - (-Vin/N)$$

The value of Vsh2−Vsh1 can be obtained based on the first sample voltage Vsh1 and the second sample voltage Vsh2:

$$Vsh2 - Vsh1 = Vds\_p(ta)/N$$

Since the value of the primary switching voltage Vds_p at time ta is the valley value Vv of the primary switching voltage Vds_p, Vsh2−Vsh1 is thus the valley indicating signal Vva which is capable of indicating the valley value Vv of the primary switching voltage Vds_p, wherein, Vva=Vv/N.

Figure 5:
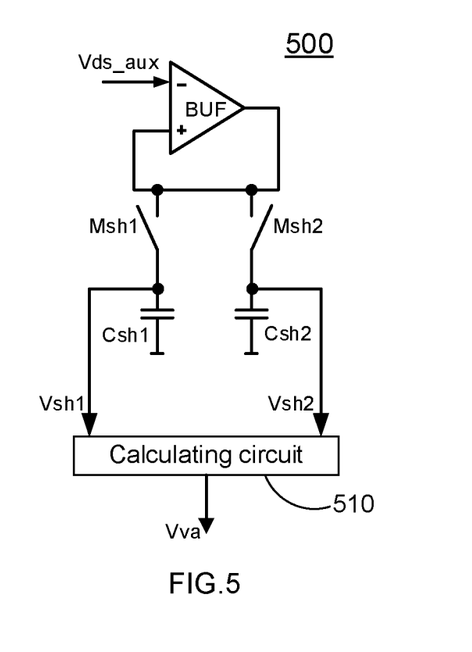
FIG. 5 schematically illustrates a valley indicating signal generation circuit 500 in accordance with an embodiment of the present invention.

FIG. 5 schematically illustrates a valley indicating signal generation circuit 500 in accordance with an embodiment of the present invention. The valley indicating signal generation circuit 500 shown in FIG. 5 can be used as the valley indicating signal generation circuit shown in FIG. 3 or FIG. 4. The valley indicating signal generation circuit 500 comprises a buffer circuit BUF, a first sample switch Msh1, a second sample switch Msh2, a first sample capacitor Csh1 and a second sample capacitor Csh2. The buffer circuit BUF has a first input terminal (e.g., an inverting input terminal), a second input terminal (e.g., a non-inverting input terminal) and an output terminal, wherein the first input terminal of the buffer circuit BUF receives the auxiliary switching voltage Vds_aux, the second input terminal of the buffer circuit BUF is coupled to the output terminal of the buffer circuit BUF. The first sample switch Msh1 and the second sample switch Msh2 each have a first terminal, a second terminal and a control terminal, wherein the first terminals of the first sample switch Msh1 and of the second sample switch Msh2 are both coupled to the output terminal of the buffer circuit BUF. The first sample capacitor Csh1 and the second sample capacitor Csh2 each have a first terminal and a second terminal, wherein the first terminals of the first sample capacitor Csh1 and of the second sample capacitor Csh2 are respectively coupled to the second terminals of the first sample switch Msh1 and of the second sample switch Msh2 correspondingly, and the second terminals of the first sample capacitor Csh1 and of the second sample capacitor Csh2 are both coupled to the primary reference ground PGND. The first terminals of the first sample capacitor Csh1 and of the second sample capacitor Csh2 respectively generate the first sample voltage Vsh1 and the second sample voltage Vsh2. In the valley indicating signal generation circuit 500 of FIG. 5, the first sample switch Msh1 is turned on for a period of time so that the auxiliary switching voltage Vds_aux is sampled after the valley value Vv of the primary switching voltage Vds_p occurs, and the sampled auxiliary switching voltage Vds_aux is held so as to generate the first sample voltage Vsh1; the second sample switch Msh2 is turned on for a period of time so that the auxiliary switching voltage Vds_aux is sampled after the primary switch Mp is turned on and the sampled auxiliary switching voltage Vds_aux is held so as to obtain the second sample voltage Vsh2. As shown in FIG. 5, the valley indicating signal generation circuit 500 further comprises a calculating circuit 510 receiving the first sample voltage Vsh1 and the second sample voltage Vsh2 and generating the valley indicating signal Vva based on the first sample voltage Vsh1 and the second sample voltage Vsh2.

Figure 6:
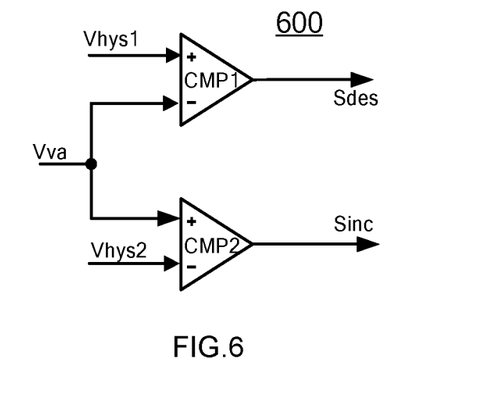
FIG. 6 schematically illustrates a comparison circuit 600 in accordance with an embodiment of the present invention.

FIG. 6 schematically illustrates a comparison circuit 600 in accordance with an embodiment of the present invention. The comparison circuit 600 can be used as the comparison circuit 302 shown in FIG. 3. The comparison circuit 600 generates the decrease control signal Sdes and the increase control signal Sinc to control the decrease, the increase or the maintenance of the reference auxiliary current Iref based on comparing the valley indicating signal Vva with the first threshold indicating signal Vhys1 and the second threshold indicating signal Vhys2. As shown in FIG. 6, the comparison circuit 600 comprises a first comparator CMP1 receiving the valley indicating signal Vva and the first threshold indicating signal Vhys1, the first comparator CMP1 generates the decrease control signal Sdes to control whether the reference auxiliary current Iref decreases based on the valley indicating signal Vva and the first threshold indicating signal Vhys1. More specifically, the first comparator CMP1 has a first input terminal (e.g., a non-inverting input terminal), a second input terminal (e.g., an inverting input terminal) and an output terminal, wherein the first input terminal of the first comparator CMP1 receives the first threshold indicating signal Vhys1, the second input terminal of the first comparator CMP1 receives the valley indicating signal Vv and the first comparator CMP1 generates the decrease control Signal Sdes based on comparing the first threshold indicating signal Vhys1 with the valley indicating signals Vva. When the valley indicating signal Vva is larger than the first threshold indicating signal Vhys1, the decrease control signal Sdes is in the non-active state (logic 0), and the decrease control signal Sdes will not control the reference auxiliary current Iref to decrease; when the valley indicating signal Vva is smaller than the first threshold indicating signal Vhys1, the decease control signal Sdes is in the active state (logic 1), and the decrease control signal Sdes will control the reference auxiliary current Iref to decrease.

The comparison circuit 600 further comprises a second comparator CMP2 receiving the valley indicating signal Vva and the second threshold indicating signal Vhys2, and the second comparator CMP2 generates the increase control signal Sinc to control whether the reference auxiliary current Iref increases based on the valley indicating signal Vva and the second threshold indicating signal Vhys2. More specifically, the second comparator CMP2 has a first input terminal (e.g., a non-inverting input terminal), a second input terminal (e.g., an inverting input terminal) and an output terminal, wherein the first input terminal of the second comparator CMP2 receives the valley indicating signal Vva, the second input terminal of the second comparator CMP2 receives the second threshold indicating signal Vhys2, the second comparator CMP2 generates the increase control signal Sinc based on comparing the valley indicating signal Vva with the second threshold indicating signal Vhys2. When the valley indicating signal Vva is larger than the second threshold indicating signal Vhys2, the increase control signal Sinc is in an active state (logic 1) and the increase control signal Sinc controls the reference auxiliary current Iref to increase; when the valley indicating signal Vva is smaller than the second threshold indicating signal Vhys2, the increase control signal Sinc is in a non-active state (logic 0), and the increase control signal Sinc will not control the reference auxiliary current Iref to increase.

Those skilled in the art will understand that, the comparison circuit 600 in FIG. 6 is just illustrative and should not be used to limit the present invention, any comparison circuit which is capable of comparing the valley indicating signal Vva with the first threshold indicating signal Vhys1 and the second threshold indicating signal Vhys2 may be applied to the present invention. For example, the comparison circuit in the embodiment of FIG. 6 illustratively comprises two comparators, yet in another embodiment, the comparison circuit may comprise one or more comparators.

Figure 7:
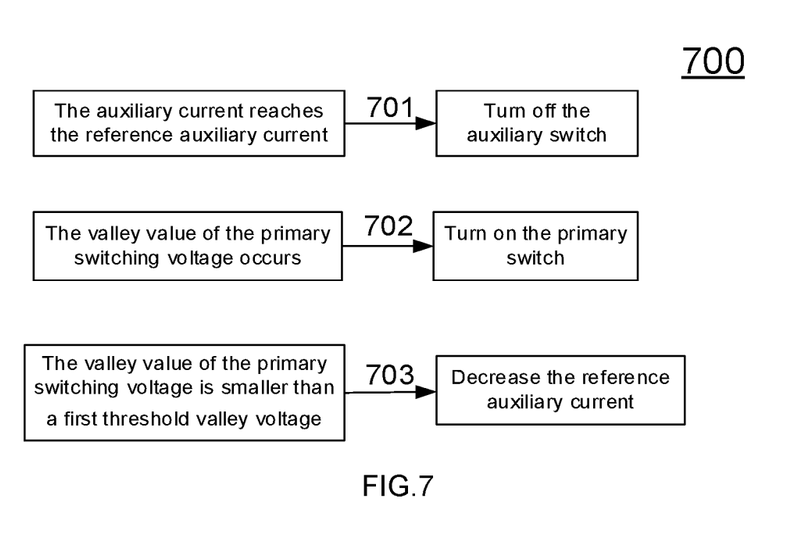
FIG. 7 shows a driving method 700 for driving a switching mode power supply in accordance with an embodiment of the present invention.

FIG. 7 shows a driving method 700 for driving a switching mode power supply in accordance with an embodiment of the present invention. The switching mode power supply comprises a transformer having a primary winding and a secondary winding with an auxiliary current flowing through the secondary winding. The switching mode power supply further comprises a primary switch and an auxiliary switch, wherein the auxiliary switch is coupled to the auxiliary winding in series, and the primary switch is coupled to the primary winding in series. A primary current flows through the primary winding. The primary switch has a first terminal and a second terminal and between the first and second terminals of the primary switch exits a primary switching voltage having a valley value. The auxiliary switch has a first terminal and a second terminal and between the first terminal and the second terminal of the auxiliary switch exits an auxiliary switching voltage. In an embodiment, the transformer, the primary switch and the auxiliary switch in the switching mode power supply of the driving method 700 have similar structures and connections as shown in FIG. 1, for the purposes of brevity, the description will not be repeated here. Further, the switching mode power supply of the driving method 700 may further comprise a secondary winding, a secondary switch and an output capacitor having similar structures and connections as shown in FIG. 1 to convert the input voltage into an output voltage.

As shown in FIG. 7, the driving method 700 comprises the steps 701-703:

In step 701, the auxiliary switch is turned off after the auxiliary current reaches a reference auxiliary current.

In step 702, the primary switch is turned on after the valley value of the primary switching voltage occurs.

In step 703, the reference auxiliary current is decreased when the valley value of the primary switching voltage is smaller than a first threshold valley voltage. In an embodiment, when the valley value of the primary switching voltage is smaller than the first threshold valley voltage, the reference auxiliary current is so decreased to make the valley value of the primary switching voltage larger than the first threshold valley voltage.

In an embodiment, the driving method 700 may further comprise increasing the reference auxiliary current when the valley value of the primary switching voltage is larger than a second threshold valley voltage, wherein the first threshold valley voltage is smaller than the second threshold valley voltage. In an embodiment, the reference auxiliary current is so increased to make the valley value of the primary switching voltage smaller than the second threshold valley voltage when the valley value of the primary switching voltage is larger than the second threshold valley voltage.

In an embodiment, the driving method 700 may further comprise maintaining the reference auxiliary current when the valley value of the primary switching voltage is located between the first threshold valley voltage and the second threshold valley voltage.

In an embodiment, the driving method 700 may further comprise generating a valley indicating signal indicative of the valley value of the primary switching voltage; determining whether to decrease the reference auxiliary current based on comparing the valley indicating signal with a first threshold indicating signal indicative of the first threshold valley voltage. More specifically, when the valley indicating signal is smaller than the first threshold indicating signal, the reference auxiliary current is decreased. In an embodiment, the driving method 700 may further comprise determining whether to increase the reference auxiliary current based on comparing the valley indicating signal with a second threshold indicating signal indicative of the second threshold valley voltage. In an embodiment, the valley indicating signal is generated based on the auxiliary switching voltage.

In an embodiment, the step of generating the valley indicating signal comprises: sampling the auxiliary switching voltage to obtain a first sample voltage after the valley value of the primary switching voltage occurs; sampling the auxiliary switching voltage to obtain a second sample voltage after the primary switch is turned on; generating the valley indicating signal based on the first sample voltage and the second sample voltage. Those skilled in the art will understand that, in an embodiment, the above description of "sampling the auxiliary switching voltage to obtain a first sample voltage after the valley value of the primary switching voltage occurs" may refer to the operation of sampling the auxiliary switching voltage to obtain the first sample voltage after a delay time since the valley value of the primary switching voltage occurs, or may refer to the operation of sampling the auxiliary switching voltage immediately after the valley value of the primary switching voltage occurs. In another embodiment, the above description of "sampling the auxiliary switching voltage to obtain a second sample voltage after the primary switch is turned on" may refer to the operation of sampling the auxiliary switching voltage to obtain the second sample voltage after a delay time since the primary switch is turned on, or may refer to the operation of sampling the auxiliary switching voltage to obtain the second sample voltage immediately after the primary switch is turned on.

In an embodiment, the primary switch comprises a super-junction metal oxide semiconductor field effect transistors (super-junction MOSFET) due to an overall small output capacitance Coss of the super-junction MOSFET, which makes the switching loss of the switching mode power supply decreased and the efficiency of the switching mode power supply improved. However, since the output capacitance Coss of the super-junction MOSFET is non-linear and gets larger and larger with the decrease of the drain-source voltage of the super-junction MOSFET (the primary switching voltage), the circulating loss will increase and the efficiency will decrease instead. In the driving method 700, since the reference auxiliary current is decreased so as to increase the valley value of the primary switching voltage (even to be larger than the first threshold valley voltage) when the valley value of the primary switching voltage is smaller than the first threshold valley voltage. In this manner, the drain source voltage between the super-junction MOSFET will not be too low, and the circulating loss will thus decrease and the efficiency will increase. In this way, the driving method of the present invention takes an advantage of the low switching loss of the super-junction MOSFET and meanwhile avoids the issue that the switching loss of the super-junction MOSFET is too large, thus improving the overall efficiency. Of course, those skilled in the art will understand that, the driving method of the present invention can not only solve the issue of the large circulating loss and thus the low efficiency of the super-junction MOSFET, the switching mode power supply 10 of the present invention can also help to improve the efficiency by decreasing the reference auxiliary current for many other circuits, for example, the circuit comprising a gallium nitride field effect transistor.

In an embodiment, the driving method 700 may further comprise: turning off the primary switch after a condition for turning off the primary switch is satisfied; turning on the auxiliary switch after a condition for turning on the auxiliary switch is satisfied. In an embodiment, the operation of turning off the primary switch may be accomplished with a peak current control mode. In yet another embodiment, the operation of turning on the auxiliary switch may be implemented after a delay time since the primary switch is turned off.

Those skilled in the art will understand that, the increase or decrease of the reference auxiliary current Iref can be linear or can be implemented with one or more steps, wherein the step length(s) of the one or more steps can be a preset fixed value or can be adjusted in real time. In an embodiment, the switching mode power supply has a plurality of switching cycles, the driving circuit decreases the reference auxiliary current by a first preset current value in the next switching cycle when the valley value of the primary switching voltage is smaller than the first threshold valley voltage. Further in an embodiment, the driving circuit increases the reference auxiliary current by a second preset current value in the next switching cycle when the valley value of the primary switching voltage is larger than the second threshold valley voltage, wherein the second preset current value and the first preset current value may be the same or different. In yet another embodiment, the increase of decrease of the reference auxiliary current may be accomplished by an analog or digital way.

Those skilled in the art will understand that, a valley value of a signal in the present invention may refer to an extremum value that is locally minimal e.g., the valley value of the primary switching voltage may refer to the minimum value of the primary switching voltage generated after the auxiliary switch is turned off and before the primary switch is turned on.

With the driving method of the present invention, the loss caused by the small primary switching voltage can be decreased, and the system efficiency can be significantly improved.

A driving method for driving a switching mode power supply is provided in accordance with an embodiment of the present invention. The switching mode power supply comprises a transformer having a primary winding and an auxiliary winding with an auxiliary current flowing through the auxiliary winding, and the switching mode power supply further comprises a primary switch and an auxiliary switch, and wherein the primary switch is coupled to the primary winding in series, and the primary switch has a first terminal and a second terminal and between the first terminal and the second terminal of the primary switch exits a primary switching voltage having a valley value, and the auxiliary switch is coupled to the auxiliary winding in series, and the auxiliary switch has a first terminal and a second terminal and between the first terminal and the second terminal of the auxiliary switch exits an auxiliary switching voltage. The driving method comprises: turning off the auxiliary switch after the auxiliary current reaches a reference auxiliary current; turning on the primary switch after the valley value of the primary switching voltage occurs; and adjusting the reference auxiliary current to make the valley value of the primary switching voltage larger than a first threshold valley voltage.

In an embodiment, the driving method further comprises: sampling the auxiliary switching voltage to obtain a first sample voltage after the valley value of the primary switching voltage occurs; sampling the auxiliary switching voltage to obtain a second sample voltage after the primary switch is turned on; and generating the valley indicating signal indicative of the valley value of the primary switching voltage based on the first sample voltage and the second sample voltage; and adjusting the reference auxiliary current based on comparing the valley indicating signal with a first threshold indicating signal indicative of the first threshold valley voltage.

It will be understand that by persons skilled in the art that the present invention is not limited to what has been particularly shown and described herein above. Rather the scope of the present invention is defined by the appended claims and comprises both combinations and sub-combinations of the various features described hereinabove as well as variations and modifications thereof which would occur to persons skilled in the art upon reading the foregoing description and which are not in the prior art.

What is claimed is:

1. A driving method for driving a switching mode power supply, wherein the switching mode power supply has a transformer having a primary winding and an auxiliary winding with an auxiliary current flowing through the auxiliary winding, and the switching mode power supply further has a primary switch and an auxiliary switch, and wherein the primary switch is coupled to the primary winding in series, and the primary switch has a first terminal and a second terminal and between the first terminal and the second terminal of the primary switch exits a primary switching voltage having a valley value, and the auxiliary switch is coupled to the auxiliary winding in series, and the auxiliary switch has a first terminal and a second terminal and between the first terminal and the second terminal of the auxiliary switch exits an auxiliary switching voltage, the driving method comprising:
turning off the auxiliary switch after the auxiliary current reaches a reference auxiliary current; and
turning on the primary switch after the valley value of the primary switching voltage occurs;
decreasing the reference auxiliary current when the valley value of the primary switching voltage is smaller than a first threshold valley voltage.

2. The driving method as claimed in claim 1, further comprising increasing the reference auxiliary current when the valley value of the primary switching voltage is larger than a second threshold valley voltage, wherein the first threshold valley voltage is smaller than the second threshold valley voltage.

3. The driving method as claimed in claim 2, further comprising maintaining the reference auxiliary current when the valley value of the primary switching voltage is located between the first threshold valley voltage and the second threshold valley voltage.

4. The driving method as claimed in claim 1, further comprising:
generating a valley indicating signal indicative of the valley value of the primary switching voltage; and
determining whether to decrease the reference auxiliary current based on comparing the valley indicating signal with a first threshold indicating signal indicative of the first threshold valley voltage.

5. The driving method as claimed in claim 4, wherein the step of generating the valley indicating signal comprises:
sampling the auxiliary switching voltage to obtain a first sample voltage after the valley value of the primary switching voltage occurs;
sampling the auxiliary switching voltage to obtain a second sample voltage after the primary switch is turned on; and
generating the valley indicating signal based on the first sample voltage and the second sample voltage.

6. The driving method as claimed in claim 1, wherein the primary switch comprises a super-junction metal oxide semiconductor field effect transistor.

7. The driving method as claimed in claim 1, wherein the switching mode power supply has a plurality of switching cycles, and the reference auxiliary current is decreased by a preset current value in the next switching cycle when the valley value of the primary switching voltage is smaller than the first threshold valley voltage.

8. A driving circuit used in a switching mode power supply, wherein the switching mode power supply has a transformer having a primary winding and a secondary winding and the switching mode power supply further has a primary switch and an auxiliary switch, wherein the auxiliary switch is coupled to the auxiliary winding in series and an auxiliary current flows through the auxiliary winding, and the primary switch is coupled to the primary winding in series, and wherein both the primary switch and the auxiliary switch have a first terminal, a second terminal and a control terminal, and between the first terminal and the second terminal of the primary switch exits a primary switching voltage having a valley value and between the first terminal and the second terminal of the auxiliary switch exits an auxiliary switching voltage, and the driving circuit provides the auxiliary off signal to control the switching-off operation of the auxiliary switch, the driving circuit comprising:

a reference auxiliary current generation circuit configured to generate a reference auxiliary current based on the valley value of the primary switching voltage and the first threshold valley voltage, wherein the reference auxiliary current is decreased when the valley value of the primary switching voltage is smaller than the first threshold valley voltage; and a comparison circuit configured to receive the reference auxiliary current and the auxiliary current and to generate an auxiliary off signal based on comparing the auxiliary current with the reference auxiliary current.

9. The driving circuit as claimed in claim 8, wherein the reference auxiliary current generation circuit is configured to generate the reference auxiliary current based on the valley value of the primary switching voltage and a second threshold valley voltage, wherein the reference auxiliary current is increased when the valley value of the primary switching voltage is larger than a second threshold valley voltage, and wherein the second threshold valley voltage is larger than the first threshold valley voltage.

10. The driving circuit as claimed in claim 8, wherein the reference auxiliary current generation circuit is configured to generate the reference auxiliary current based on comparing a valley indicating signal indicative of the valley value of the primary switching voltage with a first threshold indicating signal indicative of the first threshold valley voltage, wherein the reference auxiliary current is decreased when the valley indicating signal is smaller than the first threshold indicating signal.

11. The driving circuit as claimed in claim 10, wherein the reference auxiliary current generation circuit comprises a valley indicating signal generation circuit configured to receive the auxiliary switching voltage, and wherein the reference auxiliary current generation circuit is configured to sample the auxiliary switching voltage to obtain a first sample voltage after the valley value of the primary switching voltage occurs and to sample the auxiliary switching voltage to obtain a second sample voltage after the primary switch is turned on, and the valley indicating signal generation circuit is configured to generate the valley indicating signal based on the first sample voltage and the second sample voltage.

12. The driving circuit as claimed in claim 11, wherein the valley indicating signal generation circuit comprises:

the buffer circuit having a first input terminal, a second input terminal and an output terminal, wherein the first input terminal of the buffer circuit receives the auxiliary switching voltage, and the second input terminal of the buffer circuit is coupled to the output terminal of the buffer circuit;

a first sample switch and a second sample switch with each having a first terminal and a second terminal, wherein the first terminals of the first sample switch and of the second sample switch are both coupled to the output terminal of the buffer circuit, the first sample switch is turned on for a period of time after the valley value of the primary switching voltage occurs, and the second sample switch is turned off for a period of time after the primary switch is turned on;

a first sample capacitor and a second sample capacitor with each having a first terminal and a second terminal, and the first terminal of the first sample capacitor is coupled to the second terminal of the first sample switch and the first terminal of the second sample capacitor is coupled to the second terminal of the second sample switch, the second terminals of the first sample capacitor and of the second sample capacitor are both coupled to a reference ground, and the first terminal of the first sample capacitor is configured to provide the first sample voltage and the first terminal of the second sample capacitor is configured to provide the second sample voltage; and a calculating circuit configured to receive the first sample voltage and the second sample voltage and to generate the valley indicating signal based on the first sample voltage and the second sample voltage.

13. The driving circuit as claimed in claim 8, wherein the primary switch comprises a super-junction metal oxide semiconductor field effect transistor.

14. A switching mode power supply, comprising:

a transformer having a primary winding and a secondary winding with an auxiliary current flowing through the secondary winding;

a primary switch coupled in series with the primary winding, wherein the primary switch has a first terminal, a second terminal and a control terminal and between the first terminal and the second terminal of the primary switch exits a primary switching voltage having a valley value;

an auxiliary switch coupled in series with the auxiliary winding, wherein the auxiliary switch has a first terminal, a second terminal and a control terminal and between the first terminal and the second terminal of the auxiliary switch exits an auxiliary switching voltage; and a driving circuit comprising:

a reference auxiliary current generation circuit configured to generate a reference auxiliary current based on the valley value of the primary switching voltage and the first threshold valley voltage, wherein the reference auxiliary current is decreased when the valley value of the primary switching voltage is smaller than the first threshold valley voltage; and a comparison circuit configured to receive the reference auxiliary current and the auxiliary current and to generate an auxiliary off signal based on comparing the auxiliary current with the reference auxiliary current.

15. The switching mode power supply as claimed in claim 14, wherein the reference auxiliary current generation circuit is configured to generate the reference auxiliary current based on the valley value of the primary switching voltage and a second threshold valley voltage, wherein the reference auxiliary current is increased when the valley value of the primary switching voltage is larger than the second threshold valley voltage, and wherein the second threshold valley voltage is larger than the first a threshold valley voltage.

16. The switching mode power supply as claimed in claim 14, wherein the reference auxiliary current generation circuit is configured to generate the reference auxiliary current based on comparing a valley indicating signal indicative of the valley value of the primary switching voltage with a first threshold indicating signal indicative of the first valley voltage, wherein the reference auxiliary current is decreased when the valley indicating signal is smaller than the first threshold indicating signal.

17. The switching mode power supply as claimed in claim 16, wherein the reference auxiliary current generation circuit comprises a valley indicating signal generation circuit configured to receive the auxiliary switching voltage and to sample the auxiliary switching voltage to obtain a first sample voltage after the valley value of the primary switching voltage occurs and to sample the auxiliary switching voltage to obtain a second sample voltage after the primary switch is turned on, and the valley indicating signal generation circuit is configured to generate the valley indicating signal based on the first sample voltage and the second sample voltage.

18. The switching mode power supply as claimed in claim 17, wherein the valley indicating signal generation circuit comprises:

the buffer circuit having a first input terminal, a second input terminal and an output terminal, wherein the first input terminal of the buffer circuit receives the auxiliary switching voltage, and the second input terminal of the buffer circuit is coupled to the output terminal;

a first sample switch and a second sample switch with each having a first terminal and a second terminal, wherein the first terminals of the first sample switch and the second sample switch are both coupled to the output terminal of the buffer circuit, the first sample switch is turned on for a period of time after the valley value of the primary switching voltage occurs, and the second sample switch is turned off for a period of time after the primary switch is turned on;

a first sample capacitor and a second sample capacitor with each having a first terminal and a second terminal, and the first terminal of the first sample capacitor is coupled to the second terminal of the first sample switch and the first terminal of the second sample capacitor is coupled to the second terminal of the second sample switch, the second terminals of the first sample capacitor and of the second sample capacitor are both coupled to a reference ground, and the first terminal of the first sample capacitor is configured to provide a first sample voltage and the first terminal of the second sample capacitor is configured to provide a second sample voltage; and a calculating circuit configured to receive the first sample voltage and the second sample voltage and to generate the valley indicating signal based on the first sample voltage and the second sample voltage.

19. The switching mode power supply as claimed in claim 14, wherein the primary switch comprises a super-junction metal oxide semiconductor field effect transistor.

* * * * *